UNITED STATES PATENT OFFICE.

JAMES OLIVER, OF SOUTH BEND, INDIANA.

IMPROVEMENT IN TREATING CHILLED CAST MOLD-BOARDS FOR PLOWS.

Specification forming part of Letters Patent No. 76,652, dated April 14, 1868; reissue No. 5,829, dated April 7, 1874; application filed March 28, 1874.

DIVISION B.

*To all whom it may concern:*

Be it known that I, JAMES OLIVER, of South Bend, in the county of St. Joseph and State of Indiana, have invented a new and useful Process for Treating Chilled Castings; and I do hereby declare the following to be a full, clear, and exact description thereof, which will enable those skilled in the art to use the same.

My invention relates particularly to a new and useful process in the manufacture of mold-boards for plows; and it consists in treating the chilled castings for gradual cooling by placing them upon a bed of burning charcoal and covering the same with charcoal and hot sand, or hot dry sand alone, and excluding the air, whereby all damage by unequal shrinkage is prevented.

In casting chilled mold-boards for plows, it is well understood that the iron chill, where there is much of a body of iron, does not harden or chill the casting entirely through or upon both sides. This fact, as well as the irregular shape of the casting, occasions unequal shrinkage and a consequent strain, which is sufficient in many cases to destroy the casting by warping or cracking. Were the mold-boards either left in the flasks to cool, or taken therefrom and exposed to the atmosphere, more or less in number would be ruined from the cause mentioned.

To prevent damage, and to temper and toughen, and to consequently improve, the texture and quality of the iron, I place the mold-boards, while red-hot, in an oven upon a bed of burning charcoal, or dry hot sand, omitting the charcoal. The mold-boards are placed in a pile on the bed of charcoal in convenient number, and the pile is covered with charcoal, and then the charcoal-covered pile is covered with dry hot sand, or dry hot sand may be used without the charcoal. From this pile the atmosphere is excluded by covering the oven with plates of iron or otherwise, and luting the cracks or otherwise excluding the air. In this condition the mold-boards are left for twenty or thirty hours, more or less.

The moderate heat to which the mold-boards are thus subjected does not soften the chilled surface, while the gradual cooling prevents all damage from unequal shrinkage.

Having thus fully described my invention, what I claim as new, and desire to secure by Letters Patent, is—

The process for treating the chilled plow mold-boards for gradual cooling and preventing damage by unequal shrinkage by placing them upon a bed of burning charcoal, and covering the same with charcoal and hot sand, or hot dry sand alone, and excluding the air, as and for the purpose herein described.

JAMES OLIVER.

Witnesses:

R. C. THOMPSON,

WM. SIMMONS.